(12) United States Patent
Steinberg et al.

(10) Patent No.: US 6,595,700 B2
(45) Date of Patent: Jul. 22, 2003

(54) OPTOELECTRONIC PACKAGES HAVING INSULATION LAYERS

(75) Inventors: Dan A. Steinberg, Blacksburg, VA (US); David W. Sherrer, Blacksburg, VA (US)

(73) Assignee: Shipley Company, L.L.C., Marlborough, MA (US)

(*) Notice: Subject to any disclaimer, the term of this patent is extended or adjusted under 35 U.S.C. 154(b) by 0 days.

(21) Appl. No.: 09/824,205

(22) Filed: Apr. 3, 2001

(65) Prior Publication Data

US 2001/0036344 A1 Nov. 1, 2001

Related U.S. Application Data

(60) Provisional application No. 60/195,254, filed on Apr. 4, 2000.

(51) Int. Cl.[7] .................................................. G02B 6/42
(52) U.S. Cl. ............................................ 385/92; 385/88
(58) Field of Search ................................... 385/88, 92

(56) References Cited

U.S. PATENT DOCUMENTS

| | | | |
|---|---|---|---|
| 4,836,638 A | 6/1989 | Finzel | 350/96.21 |
| 5,179,609 A | 1/1993 | Blonder et al. | 385/89 |
| 5,259,054 A | 11/1993 | Benzoni et al. | 385/89 |
| 5,297,228 A | 3/1994 | Yanagawa et al. | 385/129 |
| 5,325,451 A | 6/1994 | Hartman et al. | 385/49 |
| 5,342,478 A | 8/1994 | Welbourn | 156/643 |
| 5,345,530 A | 9/1994 | Lebby et al. | 385/88 |
| 5,361,382 A | 11/1994 | Nakamura et al. | 385/49 |
| 5,596,662 A | 1/1997 | Boscher | 385/55 |
| 5,613,024 A | 3/1997 | Shahid | 385/52 |
| 5,633,968 A | 5/1997 | Sheem | 385/53 |
| 5,703,973 A | 12/1997 | Mettler et al. | 385/14 |
| 5,706,378 A | 1/1998 | Suzuki et al. | 385/49 |
| 5,742,720 A | 4/1998 | Kobayashi et al. | 385/89 |
| 5,784,509 A | 7/1998 | Yamane et al. | 385/49 |
| 5,913,002 A | 6/1999 | Jiang | 385/88 |
| 6,074,104 A * | 6/2000 | Higashikawa | 385/94 |
| 6,092,935 A * | 7/2000 | Althaus et al. | 385/93 |
| 6,100,595 A * | 8/2000 | Jaouen et al. | 257/778 |
| 6,164,836 A * | 12/2000 | Yamada et al. | 385/88 |
| 6,227,723 B1 * | 5/2001 | Masuda et al. | 385/88 |
| 6,282,352 B1 * | 8/2001 | Kato et al. | 385/92 |
| 6,293,711 B1 * | 9/2001 | Sasaki | 385/88 |
| 6,302,596 B1 * | 10/2001 | Cohen et al. | 385/93 |
| 6,367,988 B1 * | 4/2002 | Auracher et al. | 385/88 |

\* cited by examiner

*Primary Examiner*—Michael C. Zarroli
(74) *Attorney, Agent, or Firm*—Brown Rudnick Berlack Israels LLP (57) ABSTRACT

Optoelectronic packages comprising insulation layers, such as $SiO_2$, are made by aligning one or more optical, surface emitting or detecting devices with one or more optical fiber arrays. The insulation layers electrically insulates the surface device from a base substrate. Additionally, the layer acts as an etch stop helping to ensure that etched pits, used to retain surface devices, are etched at a depth which provides for an acceptable device-to-optical fiber spacing.

72 Claims, 10 Drawing Sheets

OPTOELECTRONIC PACKAGES HAVING INSULATION LAYERS

The present application claims the benefit of priority of pending patent application Ser. No. 60/195,254 filed on Apr. 4, 2000, the disclosure of which is hereby incorporated by reference.

BACKGROUND OF THE INVENTION

Surface emitting lasers such as vertical cavity surface emitting lasers ("VCSELs") and other optical surface emitting or detecting devices (collectively referred to as "surface devices") are now being used in optoelectronic applications, such as optical data networking.

Surface devices are typically disposed on a base substrate of some sort. Sometimes, it is necessary to electrically insulate the VCSEL from the substrate. Other times, when a VCSEL is used as a part of an optoelectronic package which comprises an optical fiber array, it is always necessary to insure that a correct fiber-to-VCSEL spacing is achieved during fabrication and assembly of the package.

Accordingly, it is a desire of the present invention to provide optoelectronic packages which comprise surface devices, such as VCSELs, which are electrically insulated from a base substrate.

It is a further desire of the present invention to provide optoelectronic packages which comprise surface devices, such as VCSELs, that are properly spaced apart from optical fibers.

Further desires will become apparent from the drawings, detailed description of the invention and claims which follow.

SUMMARY OF THE INVENTION

The present invention provides optoelectronic packages, each of which comprises a base substrate having an insulation layer. Disposed on a surface of the substrate is a surface device. The insulation layer may comprise $SiO_2$, SiN or $Al_2O_3$ for example.

As envisioned by the present invention, the surface device may comprise a VCSEL, photodetector or similar device. Over the base substrate and VCSEL is disposed a first lid having an opening. In the opening is disposed an optical fiber array which comprises one or more optical fibers disposed substantially parallel with a signal path of the VCSEL.

The packages envisioned by the present invention may comprise a plurality of surface devices and optical fiber arrays.

Sometimes, a portion of a surface device extends above the surface of the substrate. In such a case, the present invention envisions a modified lid comprising a recessed surface for receiving the surface device.

The present invention envisions packages which have a second lid. The second lid is normally placed on top of the first lid and has an opening aligned substantially parallel with the opening in the first lid.

A number of other features are contemplated by the present invention. For example, either the lids or substrate may comprise alignment pits and protrusions for aligning the lid and substrate. Further, alignment spheres (e.g., sapphire ball lenses) may be used as well.

A variety of optical fiber arrays may be apart of the packages envisioned by the present invention, including arrays which comprise V-grooves and wick stops. The wick stops help prevent an adhesive from spreading to a portion of the optical fiber arrays when the arrays are initially being assembled.

The arrays which are a part of the packages envisioned by the present invention may comprise a number of different types of optical fibers including circular and non-circular optical fibers. The surface devices envisioned by the present invention may comprise any arbitrary shape, including substantially square or rectangular shapes.

The present invention and its advantages can be best understood with reference to the drawings, detailed description of the invention and the claims that follow.

BRIEF DESCRIPTION OF THE DRAWINGS

FIGS. 13–15c depict examples of lids and arrays that may be part of optoelectronic packages envisioned by the present invention.

DESCRIPTION OF THE INVENTION

Figure 1:
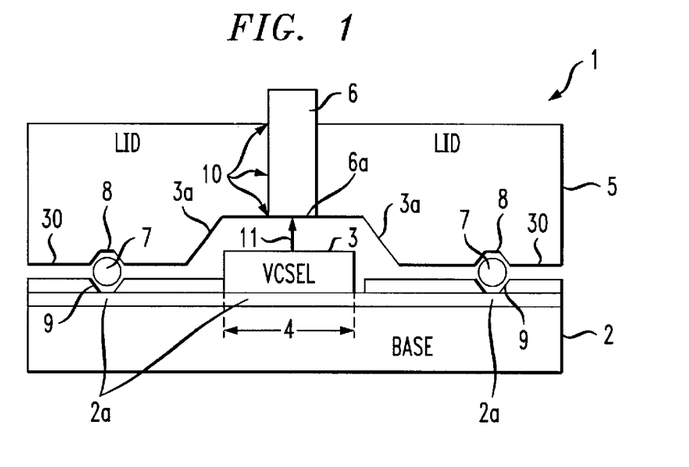
FIGS. 1–4 depict examples of optoelectronic packages which comprise insulation layers according to embodiments of the present invention.

Referring to FIG. 1, there is shown an optoelectronic device 1 according to one embodiment of the present invention. The device 1 comprises a base substrate 2 and a first lid 5. The substrate 2 further comprises an insulation layer 2a for electrically insulating the device 3 from the substrate 2. In alternative embodiments of the present invention, the layer 2a may comprise $SiO_2$, SiN or $AL_2O_3$, to give a few examples. Substrate 2 further comprises a surface device 3, such as a VCSEL.

The insulation layer 2a provides other advantages besides electrical insulation. During the etching of substrate 2, the layer 2a acts as an "etch stop" preventing additional etching. This helps define how deep the VCSEL 3 is placed into the substrate 2. This is important because it is necessary to maintain a proper VCSEL 3-to-fiber 6 distance (see distance 36 in FIG. 2). In effect, by setting the layer 2a at a certain depth in the substrate 2 this distance can be controlled.

We turn now to a discussion related to coupling the lid 5 and fiber 6 to the substrate 2.

The package 1 comprises alignment spheres 7 adapted to align the lid 5 and substrate 2. More particularly, the alignment spheres 7 are adapted to align an opening 10 with an emission path 11. In one embodiment of the present invention, the alignment spheres 7 comprise ball lenses. The ball lenses 7 may be made of many different materials, one of which is sapphire.

The substrate 2 and lid 5 may further comprise alignment pits 8, 9 adapted to receive and retain the spheres 7.

In an illustrative embodiment of the invention, the fiber 6 is aligned substantially parallel with the emission path 11 of the device 3. By so aligning the fiber 6, the invention seeks to couple optical signals emitted from the device 3 into the optical fiber 6 or other structures which may be disposed within the opening 10. Though only one optical fiber 6 is shown FIG. 1, it should be understood that the fiber 6 may in fact comprise an optical fiber array where the array comprises a plurality of optical fibers.

In the embodiment shown in FIG. 1, the lid 5 comprises a partially recessed surface 3a. Recessed surface 3a does not extend the entire length of the lid's 5 surface 30. Instead, the recessed surface is formed such that its length is slightly wider than the length of the surface device 3. This length enables the recessed surface 3 a to form a recess area that receives the surface device 3 and little else. Similarly, the embodiment shown in FIG. 2 has an optoelectronic package 1a comprising a lid 5a, with a recessed surface 3a. Such a recessed lid is needed when a surface device extends above the top surface of a substrate. As noted above, packages such as those shown in FIGS. 1 and 2 must take into account a fiber to laser distance 36. This distance may fall within the range 10–100 microns. This distance 36 must be maintained in order to insure that signals emitted from (or received by) the device 3 are correctly coupled into (or from) the fiber 6.

Figure 2:
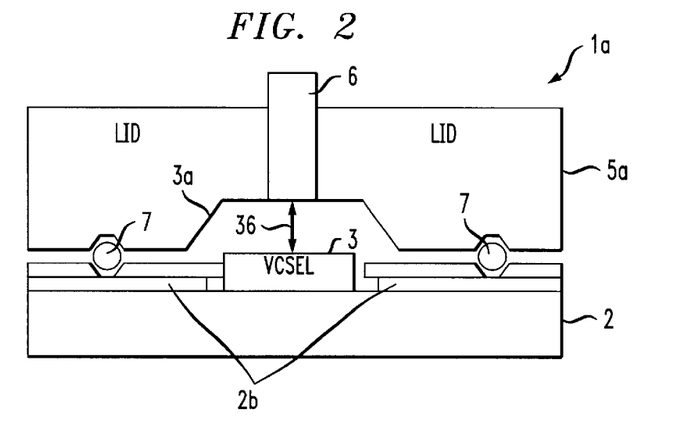

The packages shown in FIGS. 1 and 2 are not identical, however. More specifically, package 1 shown in FIG. 1 comprises a portion 4 of the insulation layer 2a deposed below the unit 3. This provides electrical isolation. In contrast, the package 1a shown in FIG. 2 comprises a base substrate 2a which does not have an insulation layer 2b below the device 3.

Figure 3:
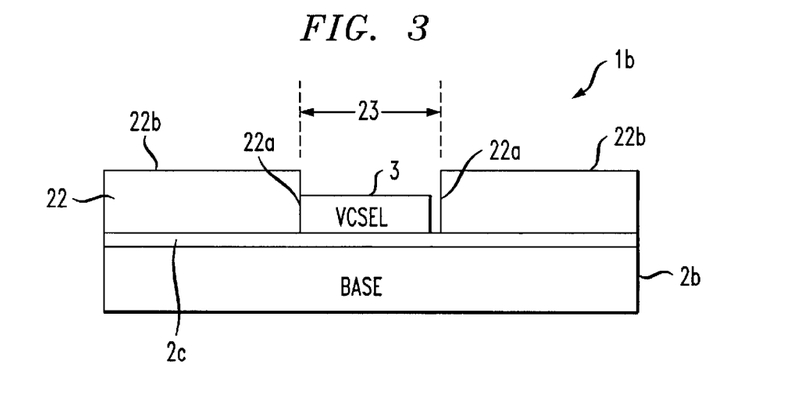

FIG. 3 depicts an alternative substrate 2b to those shown in FIGS. 1–2. Though only substrate 2b is shown in FIG. 3, it should be understood that this substrate may form a part of an optoelectronic package.

One of the distinguishing features of the substrate 2b shown in FIG. 3 is the fact that the substrate 2b comprises a device layer 22, a portion of which is disposed substantially adjacent to, and above, a surface device 3. It should be understood that prior to disposing the device 3 as shown in FIG. 3, the present invention envisions removing a portion of the device layer 22 using a Reactive Ion Etching ("RIE") or wet etching technique (e.g., KOH etching of silicon). Once a portion of the device layer 22 is removed, an opening 23 is created. Thereafter, the device 3 may be disposed in the opening 23. It should be further noted that the vertical walls 22a provide passive alignment for the device 3.

Referring now to FIGS. 4–7, there are shown additional embodiments of the present invention.

Figure 4:
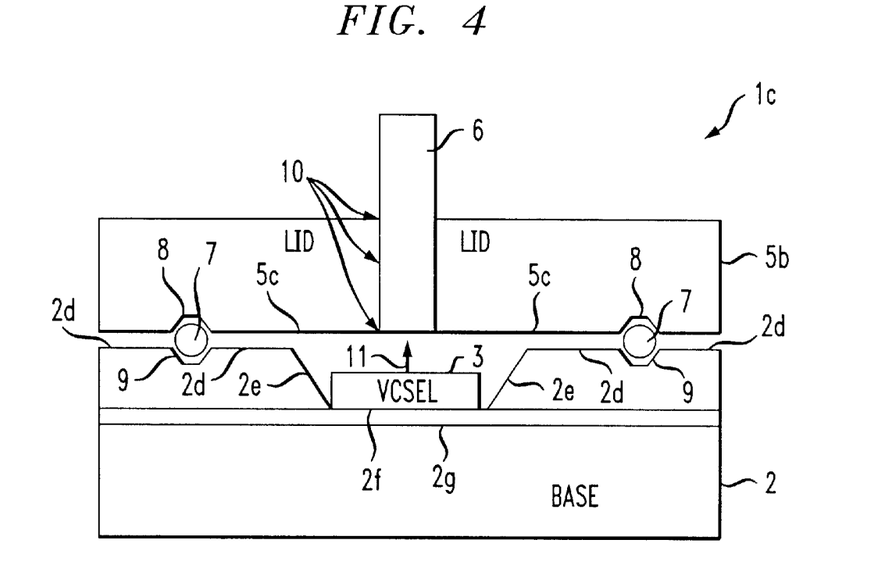

FIG. 4 shows a package 1c which comprises a substrate 2. As with the embodiments shown in FIGS. 1–3, substrate 2 comprises an insulation layer 2g. Unlike the packages discussed above, the surface device 3 is disposed in an etched optoelectronic ("O/E") pit formed by surfaces 2e and 2f.

The pit formed by surfaces 2e and 2f allows a VCSEL or other surface device 3 to be disposed below a top mating surface 2d of the substrate 2. The sidewalls 2e of the pit are adapted to provide passive alignment for device 3. In one embodiment of the present invention, the pit shown in FIG. 4 (and FIGS. 5–7) is created using a wet anisotropic etching technique. Because the device 3 is recessed into substrate 2, the lid 5b need not comprise a recess, such as recess 3a shown in FIGS. 1–2.

Figure 5:
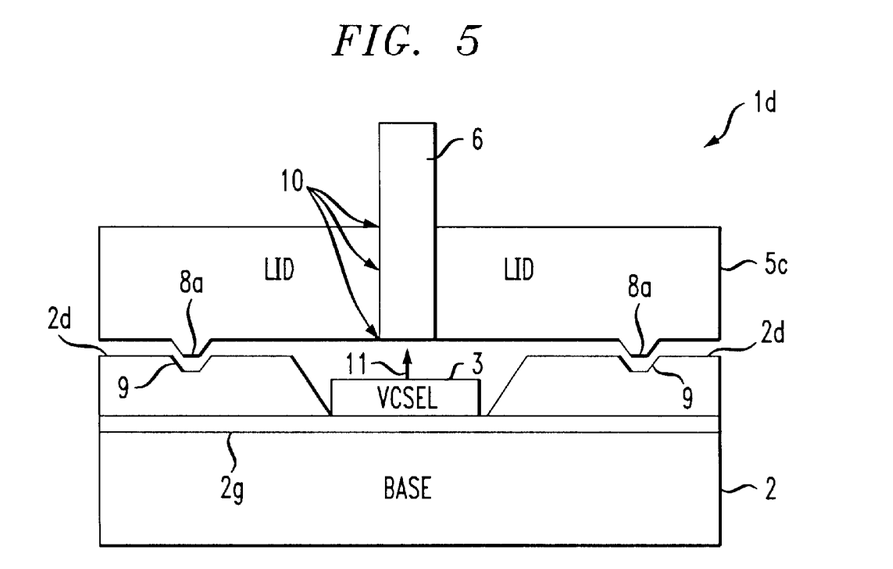
FIGS. 5–7 depict optoelectronic packages formed with alignment pits, protrusions or solder joints for properly aligning components of such packages according to other embodiments of the present invention.
Figure 6:
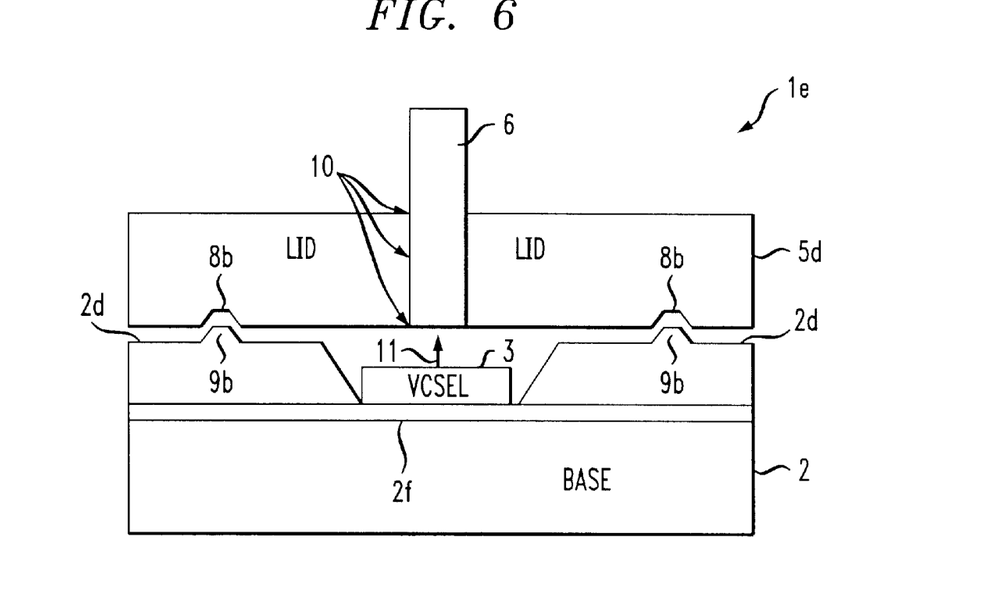
Figure 7:
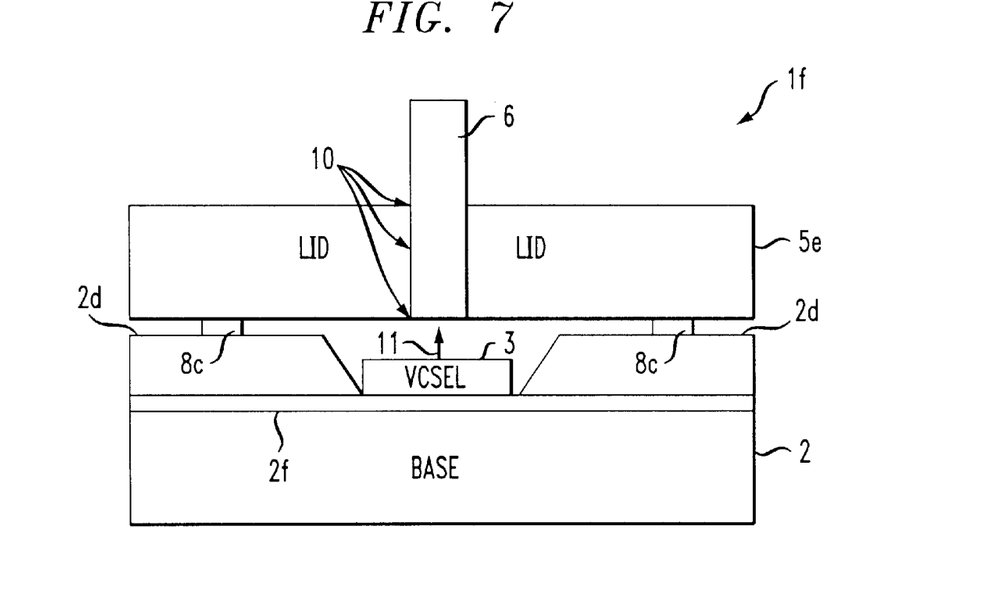

FIGS. 5–7 depict alternative ways to align a lid and a substrate. More specifically, FIG. 5 depicts alignment protrusions 8a and alignment pits 9. The alignment protrusions 8a are adapted to fit within the alignment pits 9 in order to align the lid 5c and substrate 2.

It should be understood that the alignment pits 9 shown FIG. 5 may or may not be the same as the alignment pits shown FIG. 4.

The optoelectronic package 1e shown in FIG. 6 is similar to the package 1d in FIG. 5. The only difference is that the location of the alignment protrusions and pits have been reversed (i.e., from the substrate to the lid and vice versa). That is, the protrusions on the lid 5c in FIG. 5 have been "moved" to the substrate 2 in FIG. 6. The lid 5d is adapted to comprise alignment pits 8b which in turn are adapted to receive alignment protrusions 9b in order to align lid 5d and substrate 2.

In addition to alignment pits and protrusions, the invention envisions the use of reflow solder joints to align a lid and substrate. As shown in FIG. 7, an optoelectronic package 1f comprises reflow solder joints 8c which are adapted to align a lid 5e and substrate 2.

Additional details concerning the alignment of a lid with a substrate are discussed below.

Figure 8:
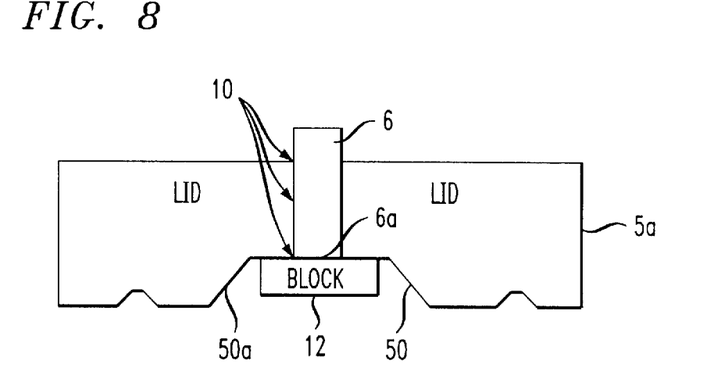
FIGS. 8–10 depict methods for insuring that the end surfaces of a lid and optical fiber can be formed into substantially one mating surface.
Figure 9:
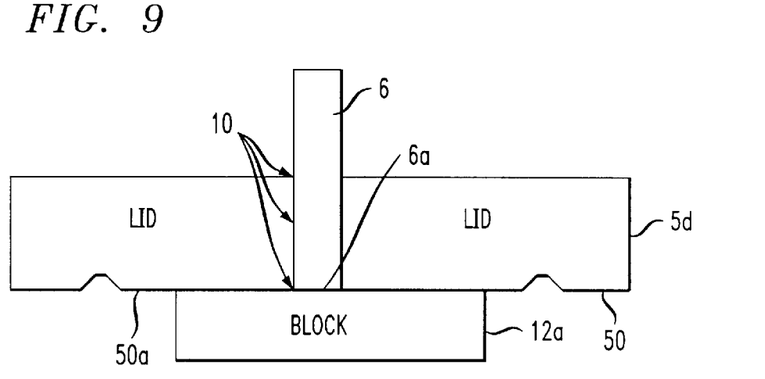

Referring back to FIG. 1, the optical fiber 6 is shown disposed in the opening 10. It should be understood that a fiber end face 6a may be cleaved before being disposed in the opening 10. Referring to FIGS. 8 and 9, after cleaving a fiduciary block 12, 12a may be placed against the end face 6a to ensure that the end face 6a and a mating surface 50, 50a are coplanar.

Figure 10:
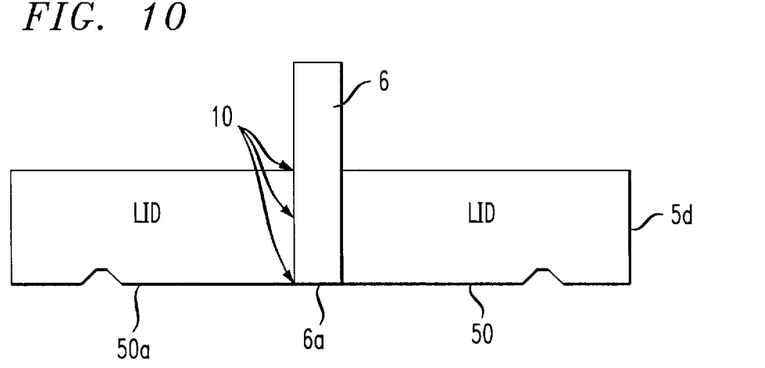

FIG. 10 depicts another technique for insuring that the surfaces are so disposed. In this embodiment, a mating surface 50 is polished with the optical fiber 6 in place. By so doing, the fiber end face 6a is polished an equal amount as the mating surface 50. Because both the mating surface 50 and fiber end face 6a are polished equally there is a greater chance that both surfaces will be coplanar. Coplanarity is not essential to the invention, however.

Figure 11A:
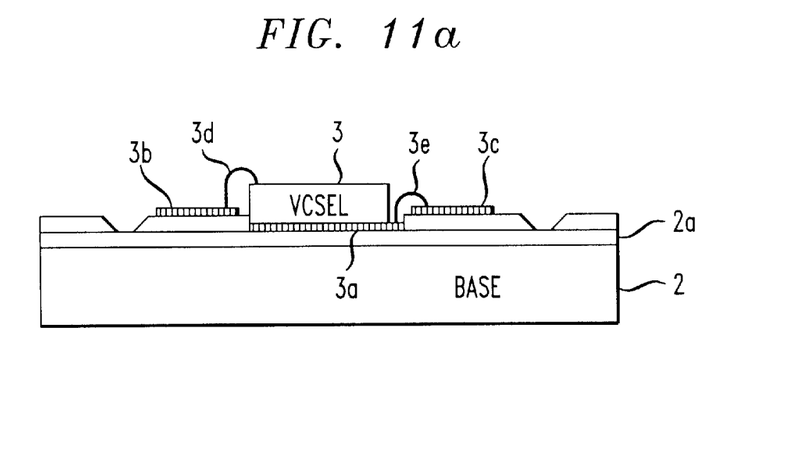
FIGS. 11a–c depict methods for connecting a surface device with electrical conductive pads according to embodiments of the present invention.
Figure 11B:
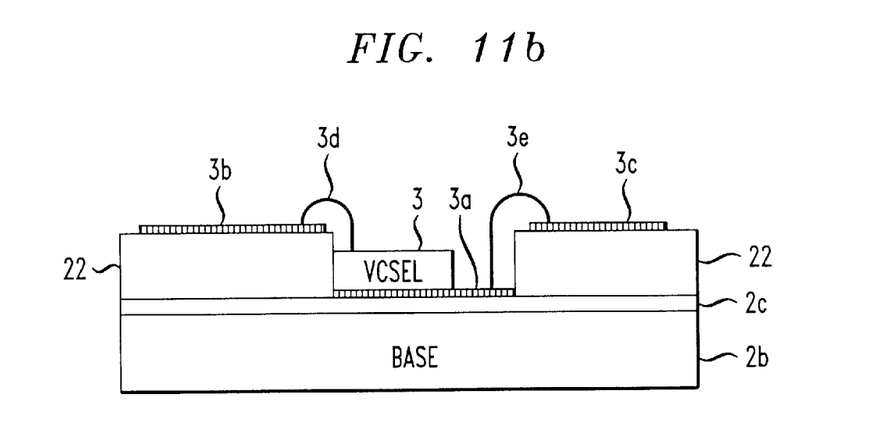
Figure 11C:
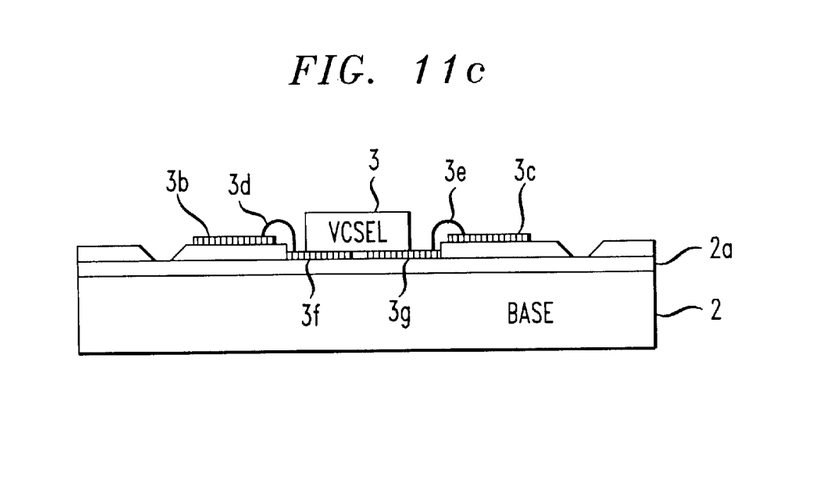

Turning now to FIGS. 11a–11c, there are depicted alternative base substrates which may be made a part of packages envisioned by the present invention.

In FIG. 11a, there is shown a base substrate 2 comprising a surface device 3 disposed on a device conductive pad 3a. In addition, substrate 2 comprises a pair of first and second conductive pads 3b, 3c which provide power to the surface device 3. In one embodiment of the present invention a first wire bond 3d is adapted to connect the device 3 and the first conductive pad 3b while a second wire bond 3e is adapted to connect the second conductive pad 3c with the device conductive pad 3a. FIG. 11b shows a similar embodiment. However, in this embodiment the first and second connective pads 3b, 3c and a portion of device layer 22 are disposed adjacently above the device 3.

In an additional embodiment of the present invention, the connections from both the first and second conductive pads are made to a device conductive pad. For example, FIG. 11c depicts first and second wire bonds 3d, 3e adapted to connect first and second conductive pads 3b, 3c to first and second device conductive pads 3f, 3g, respectively.

In each of the embodiments shown FIGS. 11a-c, it should be understood that each of the conductive and device pads 3a, 3b, 3c, 3f and 3g may comprise a metallization layer while each of the conductive connections 3d, 3e may comprise wire bonds or the like.

It was noted briefly at the beginning of this discussion that the optical fiber 6 disposed in the opening 10 (see FIG. 1) may comprise more than a single fiber; it may in fact comprise an optical fiber array.

Figure 12:
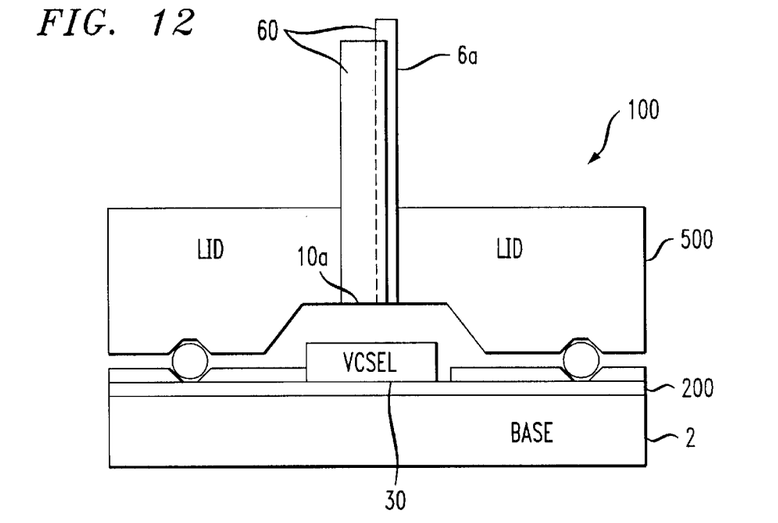
FIG. 12 depicts an optoelectronic package comprising an optical fiber array according to one embodiment of the present invention.

FIG. 12 depicts an embodiment which comprises a fiber array 60. As shown, a package 100 comprises a lid 500 which in turn comprises an opening 10a for accommodating the array 60. Opening 10a acts to passively align the array 60. The array 60 comprises one or more optical fibers 6a. Similar to previous embodiments, the substrate 2 comprises an insulation layer 200.

Figure 13:
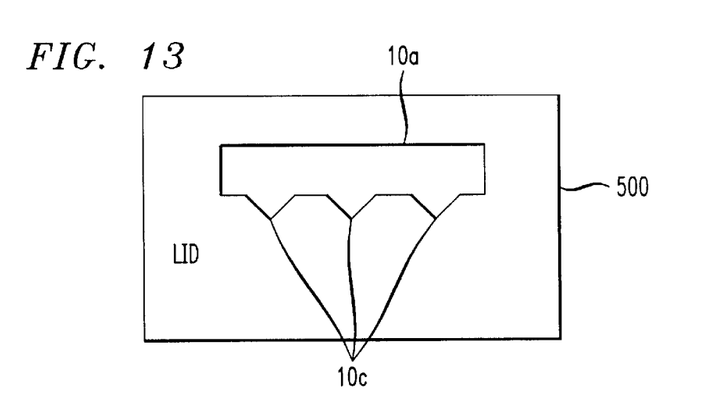

FIG. 13 depicts a top view of the opening 10. As is shown, the opening 10 comprises one or more notches 10c.

Figure 14:
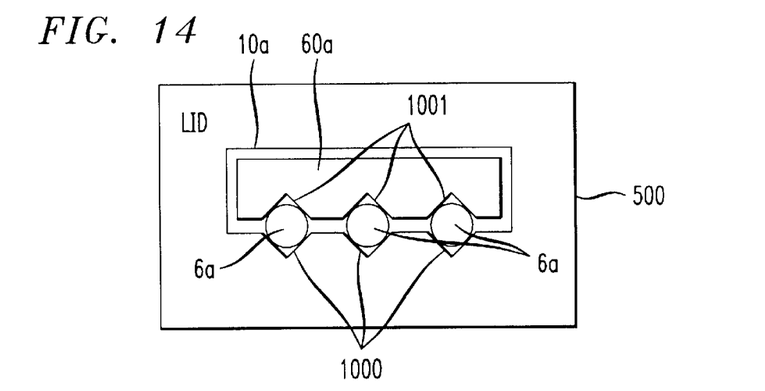

The optical fiber array 60 may comprise many designs, once of which is a V-groove array. FIG. 14 depicts a top view of a V-groove array 60a disposed in the opening 10a. Though the embodiment shown FIG. 14 depicts the use of substantially circular optical fibers 6a, it should be understood that other types of fibers may be used as well. More specifically, non-circular, polarization maintaining ("PM") fiber such as triangular PM fiber or D-shaped PM fiber may used.

The array 60a comprise V-grooves 1001 to help passively align the optical fiber 6a. This is not the only type of array envisioned by the present invention. Instead, an array may also comprise a flat plate, such as a silica plate, to give just one example.

Figure 15A:
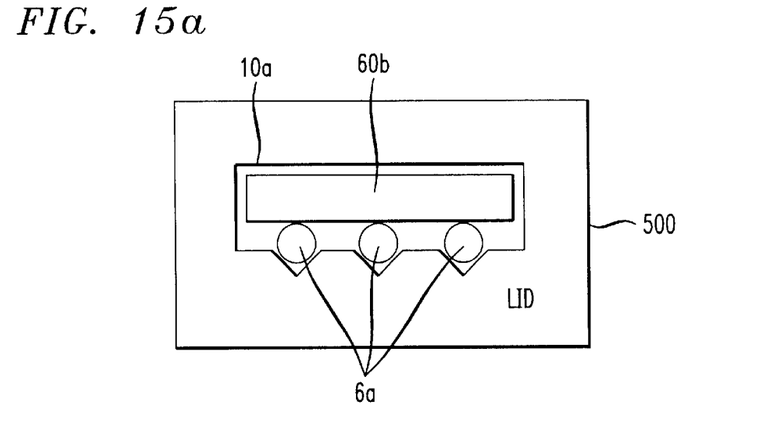
Figure 15B:
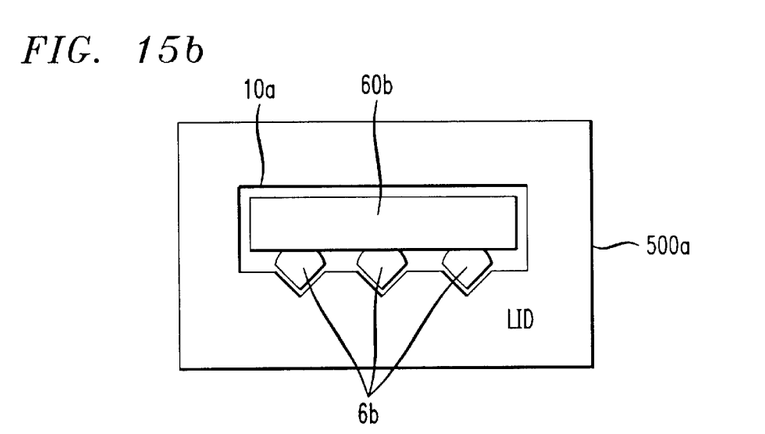
Figure 15C:
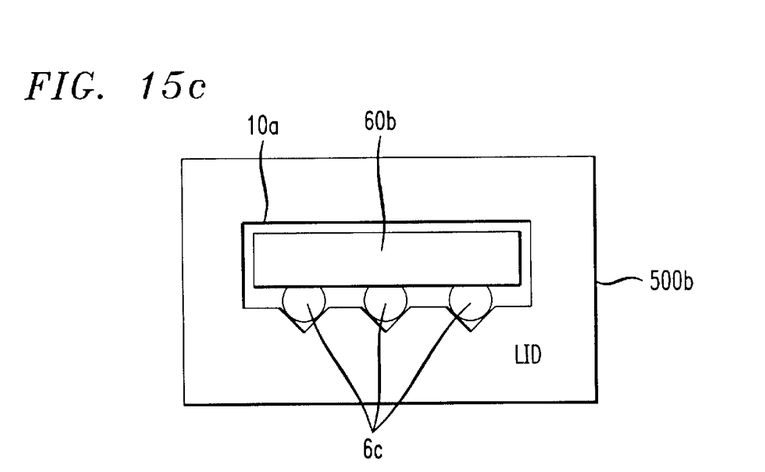

FIGS. 15a–15c depict top views of optical fiber arrays 60b, each comprising a silica plate. As with V-groove optical fiber arrays, the arrays shown in FIGS. 15a–15c illustrate the fact that arrays envisioned by the present invention may comprise substantially circular or non-circular (e.g., triangular or D-shaped) PM fiber.

Figure 16:
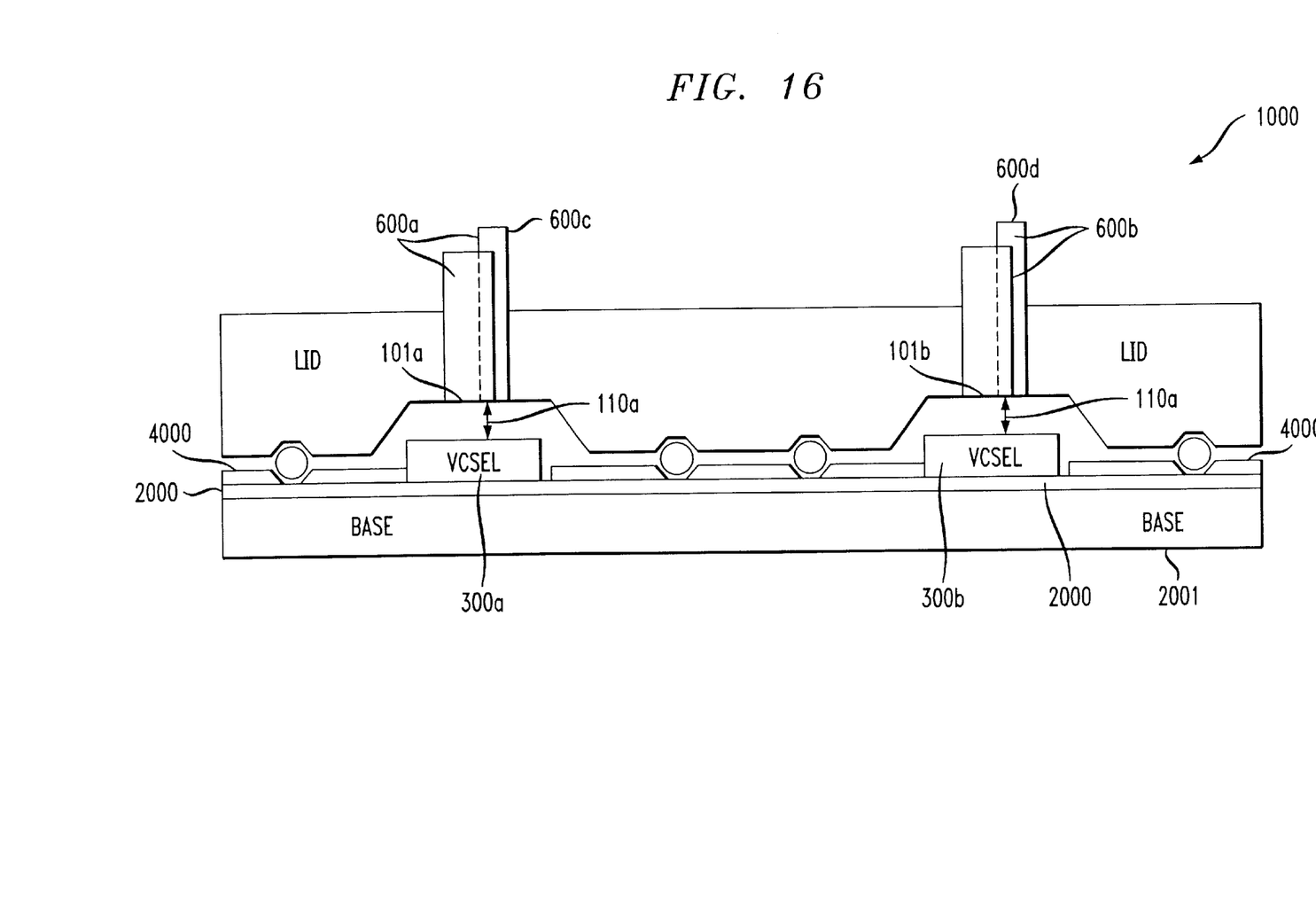
FIG. 16 depicts an optoelectronic package comprising more than one optical fiber array and surface device according to one embodiment of the present invention.

Though the embodiments discussed so far have highlighted packages which comprise a single, optical fiber array and surface device the present invention is not so limited. Rather, the present invention envisions alternative packages which may comprise a plurality of optical fiber arrays and surface devices. For example, FIG. 16 depicts two optical fiber arrays 600a and 600b and two surface devices 300a and 300b. In these embodiments, it should be understood that each of the arrays 600a, 600b is disposed in an opening 101a, 101b. Further, each array comprises one or more fibers 600c, 600d that are aligned substantially parallel with emission paths 110a of the devices 300a, 300b. Though only two arrays 600a, 600b and devices 300a, 300b are shown in FIG. 16, it should be understood that the present invention envisions optoelectronic packages which comprise more than two arrays and devices. In the embodiment depicted in FIG. 16, an insulation layer 2000 extends throughout substrate 2001.

Figure 17A:
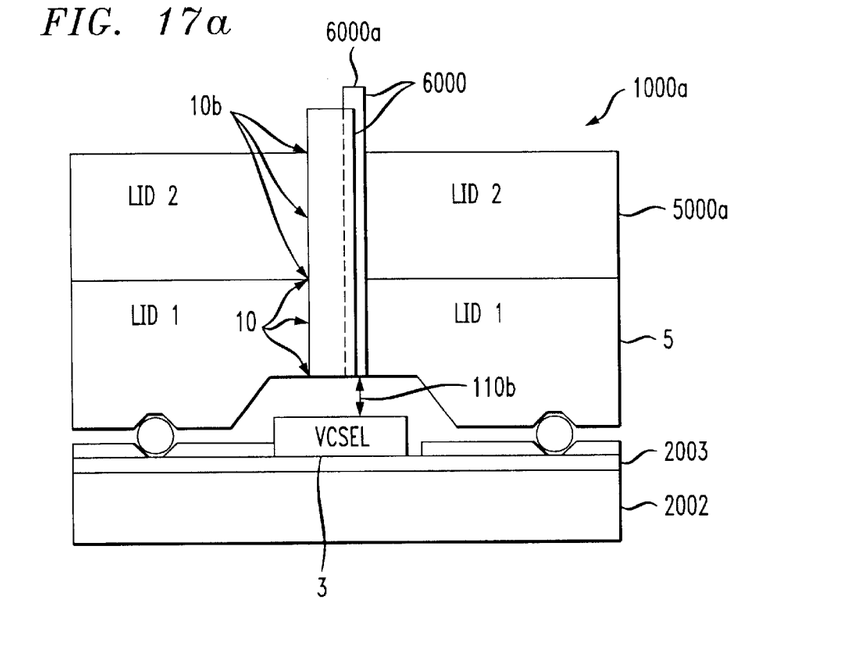
FIGS. 17a and 17b depict optoelectronic packages comprising more than one lid according to yet additional embodiments of the present invention.
Figure 17B:
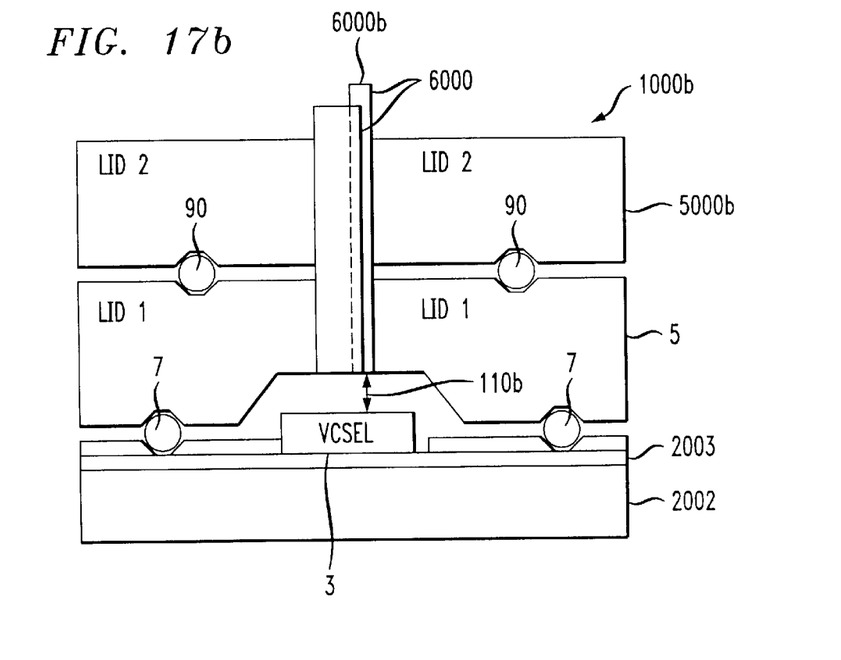

Further, though the package shown in FIG. 16 (and 17a, 17b) shows a surface device disposed above a mating surface it should be further understood that the present invention envisions similar packages where the surface device is disposed below the mating surface as well.

It was mentioned before that alignment lenses are used to passively align lids with their corresponding substrates (see FIG. 1). In addition to alignment lenses, the present invention envisions other techniques for improving the alignment of a lid and associated optical fibers with their corresponding substrates.

FIGS. 17a and 17b depict packages 1000a, 1000b which comprise a second lid 5000a, 5000b to improve the alignment of an optical fiber array 6000. More specifically, in FIG. 17a the second lid 5000a comprises an opening 10b and at least one optical fiber 6000a which is aligned substantially parallel with an emission path 110b of a device 3. The opening 10b in the second lid 5000a may be created using RIE etching in substantially the same manner as the opening 10 in the first lid 5. Both packages 1000a, 1000b comprise substrates 2002, which in turn comprise an insulation layer 2003. The embodiment shown in FIG. 17b is similar to the one shown in FIG. 17a, except that additional alignment lenses 90 have been added. The additional alignment lenses 90 are adapted to align the second lid 5000b with the first lid 5. By so doing, the invention seeks to insure that the optical fibers within array 6000 are aligned substantially parallel with the emission path 110b of the device 3.

When optical fiber arrays are used instead of individual optical fibers, the present inventions also envisions techniques for insuring that the endfaces of fiber used in such arrays also remain substantially parallel to the mating surface of a lid (i.e., smooth).

Figure 18:
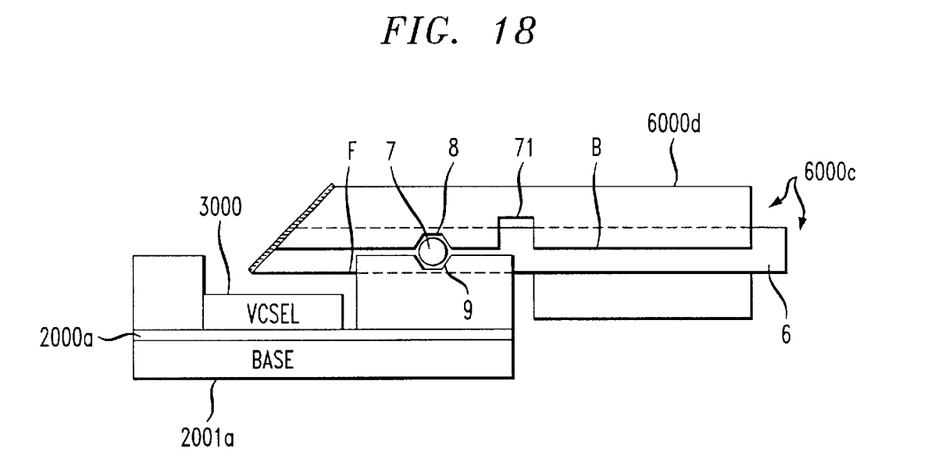
FIG. 18 depicts an optical fiber array which may be made a part of an optoelectronic package according to an additional embodiment of the present invention.

Referring to FIG. 18, there is shown one type of fiber array which may be a part of packages envisioned by the present invention. More specifically, FIG. 18 depicts a V-groove optical fiber array 6000c created by disposing an optical fiber 6 onto a V-groove chip 6000d. the V-groove chip 6000d has a back portion "B" covered with an adhesive (e.g., a glue) while a front portion "F" remains free of the adhesive during assembly of the array due to the presence of a wick stop 71.

It should be noted that, though in the discussion above we have focused on creating optoelectronic packages where fiber endfaces have been polished to be substantially parallel with a mating surface of a lid, this need not always be the case. Alternatively, optoelectronic packages envisioned by the present invention may comprise optical fiber arrays having fiber endfaces which are polished at an angle to reduce back reflection.

It should be further understood that changes and variations may be made without departing from the spirit and scope of the present invention. For example, optoelectronic packages envisioned by the present invention may also comprise arrays which comprise one or more wick stops, such as those disclosed in U.S. patent application Ser. No. 09/526,922. In addition, the surface devices envisioned by the present invention may comprise an arbitrary shape, including substantially square or rectangular shaped devices.

Finally, though all of the embodiments shown in FIGS. 1–18 depict the surface device as a laser (or more generally, a transmitter) it should be understood that the present invention also envisions similar embodiments where the lasers are replaced with photodetectors and the like. Similarly, though the path between the fiber/fiber arrays and laser has been referred to as an emission path, it may also be a "reception" path when the surface device comprises a photodetector. Generally, such a path may be referred to as a signal path for receiving or emitting optical signals.

Further changes and variations to the present invention can be envisioned without departing from the spirit and scope of the present invention as defined by the claims that follow:

We claim:

1. An optoelectronic package comprising:
a base substrate, the substrate comprising an insulation layer and a surface device disposed on a surface of the substrate;
a first lid disposed on the substrate having an opening; and
an optical fiber disposed in the opening aligned substantially parallel with a signal path of the device.

2. The package as in claim 1 wherein the layer comprises $SiO_2$.

3. The package as in claim 1 wherein the layer comprises silicon nitride.

4. The package as in claim 1 wherein the layer comprises $AL_2O_3$.

5. The package as in claim 1 further comprising alignment spheres adapted to align the lid and substrate.

6. The package as in claim 1 wherein the lid comprises alignment pits.

7. The package as in claim 1 wherein the substrate comprises alignment pits.

8. The package as in claim 1 wherein the lid comprises alignment protrusions.

9. The package as in claim 1 where the substrate comprises alignment protrusions.

10. The package as in claim 1 further comprising reflow solder joints adapted to couple the lid and substrate.

11. The package as in claim 1 wherein the insulation layer is disposed beneath the device.

12. The package as in claim 1 wherein the insulation layer is not disposed beneath the device.

13. The package as in claim 1 further comprising a first wire bond adapted to connect the device and a first conductive pad and a second wire bond adapted to connect a second conductive pad and a device conductive pad.

14. The package as in claim 13 wherein each pad comprises a metallization layer.

15. The package as in claim 1 where the optical fiber comprises an optical fiber array.

16. The package as in claim 15 wherein the array includes optical fibers disposed in V-grooves.

17. The package as in claim 15 wherein said package includes at least one wick stop.

18. The package as in claim 1 further comprising a second lid having an opening.

19. The package as in claim 1 wherein the surface device comprises a substantially square shaped device.

20. The package as in claim 1 wherein the surface device comprises a substantially rectangular shaped device.

21. The package as in claim 1 wherein the fiber comprises a non-circular fiber.

22. The package as in claim 21 wherein the non-circular fiber comprises a substantially triangular shaped, PM fiber.

23. The package as in claim 21 wherein the non-circular fiber comprises a substantially D-shaped, PM fiber.

24. An optoelectronic package according to claim 1 wherein said substrate comprises a silicon base substrate having a wet-etched pit.

25. An optoelectronic package according to claim 1 wherein said lid comprises a silicon lid having an RIB-etched hole.

26. An optoelectronic package according to claim 1 wherein said lid comprises a silicon lid having lithographically formed alignment features.

27. An optoelectronic package comprising:
a base substrate, the substrate comprising an insulation layer and a surface device disposed in a O/E pit;
a first lid disposed on the substrate having an opening; and
an optical fiber disposed in the opening aligned substantially parallel with a signal path of the device.

28. The package as in claim 27 wherein the layer comprises $SiO_2$.

29. The package as in claim 27 wherein the layer comprises silicon nitrate.

30. The package as in claim 27 wherein the layer comprises $AL_2O_3$.

31. The package as in claim 27 further comprising alignment spheres adapted to align the lid and substrate.

32. The package as in claim 27 wherein the lid comprises alignment pits.

33. The package as in claim 27 wherein the substrate comprises alignment pits.

34. The package as in claim 27 wherein the lid comprises alignment protrusions.

35. The package as in claim 27 where the substrate comprises alignment protrusions.

36. The package as in claim 27 further comprising reflow solder joints adapted to couple the lid and substrate.

37. The package as in claim 27 wherein the insulation layer is disposed beneath the device.

38. The package as in claim 27 wherein the insulation layer is not disposed beneath the device.

39. The package as in claim 27 further comprising a first wire bond adapted to connect the device and a first conductive pad and a second wire bond adapted to connect a second conductive pad and a device conductive pad.

40. The package as in claim 39 wherein each pad comprises a metallization layer.

41. The package as in claim 27 where the optical fiber comprises an optical fiber array.

42. The package as in claim 41 wherein the array includes optical fibers disposed in V-grooves.

43. The package as in claim 41 wherein said package includes at least one wick stop.

44. The package as in claim 27 further comprising a second lid having an opening.

45. The package as in claim 27 wherein the surface device comprises a substantially square shaped device.

46. The package as in claim 27 wherein the surface device comprises a substantially rectangular shaped device.

47. The package as in claim 27 wherein the fiber comprises a non-circular fiber.

48. The package as in claim 47 wherein the non-circular fiber comprises a substantially triangular shaped, PM fiber.

49. The package as in claim 47 wherein the non-circular fiber comprises a substantially D-shaped, PM fiber.

50. An optoelectronic package comprising:
a base substrate, the substrate comprising an insulation layer and a surface device disposed on, and extending above, a surface of the substrate;
a first lid disposed on the substrate having an opening and a recessed surface for receiving the device; and
an optical fiber disposed in the opening aligned substantially parallel with a signal path of the device.

51. The package as in claim 50 wherein the layer comprises $SiO_2$.

52. The package as in claim 50 wherein the layer comprises silicon nitrate.

53. The package as in claim 50 wherein the layer comprises $AL_2O_3$.

54. The package as in claim 50 further comprising alignment spheres adapted to align the lid and substrate.

55. The package as in claim 50 wherein the lid comprises alignment pits.

56. The package as in claim 50 wherein the substrate comprises alignment pits.

57. The package as in claim 50 wherein the lid comprises alignment protrusions.

58. The package as in claim 50 where the substrate comprises alignment protrusions.

59. The package as in claim 50 further comprising reflow solder joints adapted to couple the lid and substrate.

60. The package as in claim 50 wherein the insulation layer is disposed beneath the device.

61. The package as in claim 50 wherein the insulation layer is not disposed beneath the device.

62. The package as in claim 50 further comprising a first wire bond adapted to connect the device and a first conductive pad and a second wire bond adapted to connect a second conductive pad and a device conductive pad.

63. The package as in claim 62 wherein each pad comprises a metallization layer.

64. The package as in claim 50 where the optical fiber comprises an optical fiber array.

65. The package as in claim 64 wherein the array includes optical fibers disposed in V-grooves.

66. The package as in claim 64 wherein said package includes at least one wick stop.

67. The package as in claim 50 further comprising a second lid having an opening.

68. The package as in claim 50 wherein the surface device comprises a substantially square shaped device.

69. The package as in claim 50 wherein the surface device comprises a substantially rectangular shaped device.

70. The package as in claim 50 wherein the fiber comprises a non-circular fiber.

71. The package as in claim 70 wherein the non-circular fiber comprises a substantially triangular shaped, PM fiber.

72. The package as in claim 70 wherein the non-circular fiber comprises a substantially D-shaped, PM fiber.

\* \* \* \* \*